United States Patent [19]
Nyberg

[11] 4,207,364
[45] * Jun. 10, 1980

[54] HEAT-SHRINKABLE LAMINATE

[75] Inventor: David D. Nyberg, Sunnyvale, Calif.

[73] Assignee: Raychem Corporation, Menlo Park, Calif.

[*] Notice: The portion of the term of this patent subsequent to Jul. 12, 1994, has been disclaimed.

[21] Appl. No.: 805,532

[22] Filed: Jun. 10, 1977

Related U.S. Application Data

[62] Division of Ser. No. 285,567, Sep. 1, 1972, Pat. No. 4,035,534.

[51] Int. Cl.² ............... F16L 9/14; B32B 31/00; H02G 15/02; B29C 27/00
[52] U.S. Cl. ............... 428/36; 138/140; 174/73 R; 174/DIG. 8; 156/85; 156/86; 156/84; 264/230; 428/913
[58] Field of Search .......... 174/73 R, 73 SC, DIG. 8; 156/84, 85, 86; 138/140; 428/36, 516, 913

[56] References Cited

U.S. PATENT DOCUMENTS

| | | | |
|---|---|---|---|
| 3,243,211 | 3/1966 | Wetmore | 174/DIG. 8 |
| 3,382,121 | 5/1968 | Sherlock | 156/86 |
| 3,415,287 | 12/1968 | Heslop et al. | 174/DIG. 8 |
| 3,582,457 | 6/1971 | Barthell | 174/DIG. 8 |
| 3,669,824 | 6/1972 | Hess | 428/212 |
| 3,717,717 | 2/1973 | Cunningham | 174/73 R |
| 4,035,534 | 7/1977 | Nyberg | 428/36 |

Primary Examiner—William R. Dixon, Jr.
Attorney, Agent, or Firm—Lyon & Lyon

[57] ABSTRACT

An article such as a tube formed of heat-shrinkable material is bonded exteriorly or interiorly to an elastomeric member to form a laminated article. The bonding preferably takes place before heating and expanding of the heat-shrinkable tube. After expansion and cooling, the parts remain in the heat recoverable position. Subsequent heating of the parts causes them to recover radially about a substrate.

2 Claims, 12 Drawing Figures

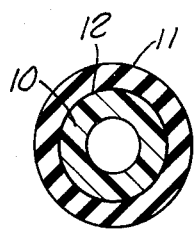 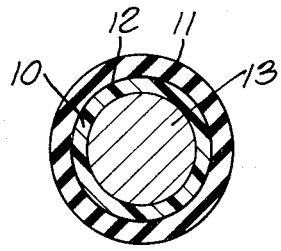 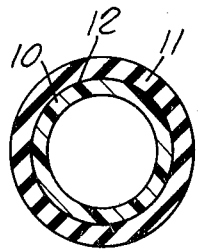 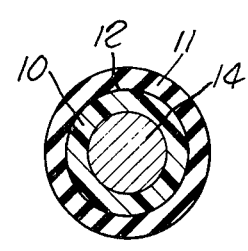
FIG. 1.   FIG. 2.   FIG. 3.   FIG. 4.
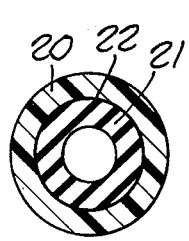 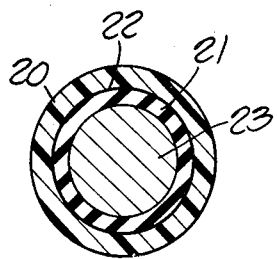 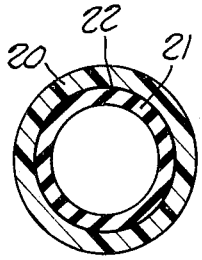 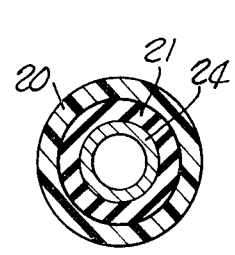
FIG. 5.   FIG. 6.   FIG. 7.   FIG. 8.
 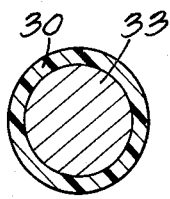 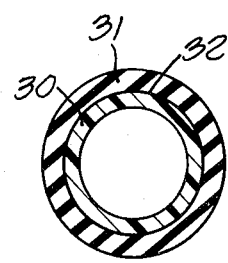 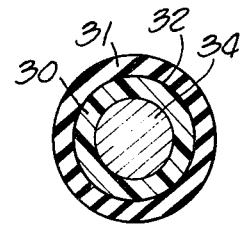
FIG. 9.   FIG. 10.   FIG. 11.   FIG. 12.

HEAT-SHRINKABLE LAMINATE

This is a division of application Ser. No. 285,567, filed Sept. 1, 1972, now U.S. Pat. No. 4,035,534.

This invention relates to heat-shrinkable items of two-part construction. One of the parts is formed of heat-shrinkable material possessing elastic memory or plastic memory properties. The other part is formed of soft, flexible rubber or other rubber-like material not necessarily heat-shrinkable but possessing desirable physical or chemical properties. One part is laminated to the other in a tube or molded part configuration.

Because of the negligible crystallinity of very low modulus rubber, it is not possible to obtain a single component heat-shrinkable part of low hardness, for example below about 30 Shore A, with conventional techniques. The heat-shrinkable component possessing the property of elastic memory can be either an inner core or an outer shell, and the other component is formed around or inside the heat-shrinkable part. Good adhesion of the two components may be required, and thus an adhesive or coupling agent may be required at the interface.

A composite tubular member having an outer layer of material not necessarily heat-shrinkable is useful when the outer layer should be quite soft, relatively thick (e.g., more than about ⅛" in thickness), or have other characteristics, such as electrical insulation improved weathering to oxygen, light or ozone, etc., improved resistance to chemicals such as solvents or better tear strength or abrasion resistance. Where the heat-shrinkable component comprises an outer shell, the other component or layer of the tubular member may be chosen on the basis of desired physical or chemical properties for example, those mentioned above.

Various heat recoverable materials, which possess sufficient rigidity to hold out the elastomeric layer, are well known to those skilled in the art and may be used in this invention for the heat recoverable layer. Suitable heat recoverable materials are thermoplastic polymers which have been crosslinked, or which inherently possess the property of heat recoverability.

Examples of desirable thermoplastic polymers which have been crosslinked or which inherently possess the property of heat recoverability are polyolefins, such as polyethylene, ethylene-vinyl acetate copolymer, ethylene-ethyl acrylate copolymer or other ethylene copolymers, polyvinylidine difluoride, polyvinyl chloride, etc. Also, elastomeric thermoplastic materials such as those described in U.S. Pat. No. 3,597,372, the disclosure of which is incorporated herein by reference, may be used.

Additional compounds which may be used are various thermoplastic elastomers known as elastoplastics such as thermoplastic polyurethanes, polymers marketed by Shell under the mark KRATON which are styrene-butadiene-styrene and styrene-isoprene-styrene block copolymers, polyester-polyether copolymers, silicone-carbonate and silicone-styrene block copolymers, graft copolymers such as the natural rubber-methyl methacrylate graft copolymer sold under the trade name HEVEA PLUS, etc.

Additionally, other flexible polymers possessing necessary crystallinity such as ethylene-propylene-diene terpolymers, trans-polybutadiene and trans-polyisoprene may be used. In addition, various commercially available elastomer-thermoplastic blends such as nitrile rubber-PVC and nitrile rubber-ABS may be employed.

Although the terms "heat-recoverable" or "heat-shrinkable" are used in this specification, it should be understood that suitable thermoplastic material, e.g. a glassy or crystalline linear polymer, not necesarily heat-recoverable, may be used in essentially the same manner as the heat-recoverable sleeve. It is only necessary that said thermoplastic material, used in place of the heat-recoverable material, have sufficient rigidity at storage temperatures to hold the elastomeric sleeve in the desired stretched position. Such a thermoplastic material sleeve could be bonded to the elastomeric sleeve on either the inside or outside, by molding it in place or by placing concentric sleeves of thermoplastic material and relaxed elastomeric material in contact with each other and bonding them at the interface.

For the elastomeric layer, virtually any desired material possessing elastomeric properties may be used. Suitable elastomers include rubber or rubber-like material such as natural rubber, cis-polyisoprene, cis-polybutadiene, styrene-butadiene rubber (SBR), butadieneacrylonitrile rubber, polychloroprene (Neoprene), butyl rubber, polysulfide, silicone rubber, urethane rubber, polyacrylate, epichlorohydrin homo- and copolymers, propylene oxide rubber, fluorosilicone rubber, fluorohydrocarbon rubber, chlorosulfonated polyethylene, chlorinated polyethylene and nitroso rubber. In addition, highly plasticized thermoplastic such as PVC plastisol may be useful in some embodiments.

It is generally desirable that the two layers be bonded to each other, although it is not necessary in all cases. Thus, if the heat recoverable layer is the inner layer, for example, the external rubber layer may adhere tightly enough to it by virtue of its tendency to contract down onto the heat recoverable layer. In other applications and where the elastomeric material is the inner layer, a stronger bond may be desired. A bond can be achieved by various means available to those skilled in the art. Thus, any suitable adhesive may be used to bond the heat recoverable and elastomeric layers. Exemplary of such adhesives are peroxides, either organic or silyl, which form crosslinks between the two layers; laminating adhesives, such as polyesters, polyurethanes, etc.; structural adhesives such as epoxies, nitrile rubber, phenolics, cyanoacrylics, etc.; hot melt adhesives of suitable bond strength and softening temperatures, such as polyamides and various rubber-based adhesives such as those based on silicone nitrile and neoprene.

It may be desired to fuse or weld the two layers together without use of an adhesive. Such bonding may be achieved simply by heating the layers to a high enough temperature at their interface so that they become flowable and then applying sufficient pressure to achieve a fusing or welding of the layers.

This invention provides a heat recoverable elastomeric sleeve having a thickness and properties not previously obtainable. In making the sleeve it is normally desirable that the elastomeric portion of the sleeve be in the stretched condition when the sleeve is in its heat recoverable state. Thus the elastomeric portion is normally bonded to the heat recoverable sleeve when that sleeve is in its recovered or heat stable condition. It is, of course, possible to stretch the elastomeric sleeve and bond it to an expanded heat recoverable sleeve but such a process is often more difficult.

In the drawings:

FIGS. 1-4 are transverse sectional views showing steps in a process for heat-shrinking laminated tubes onto a support member, the heat-shrinkable tube lying inside the elastomeric tube.

FIG. 1 shows an inner tube of heat-recoverable material bonded on its outer surface to a rubber tube having desirable physical or chemical properties.

FIG. 2 shows the tubes after heating and expansion on a mandrel.

FIG. 3 shows the tubes after cooling and after withdrawing the mandrel.

FIG. 4 shows the tubes after heating of at least the heat-shrinkable tube to cause it to shrink upon a central support member.

FIGS. 5-8 are transverse sectional views showing steps in a process for heat-shrinking laminated tubes onto a support member, the heat-shrinkable tube lying outside the inner tube.

FIGS. 9-12 are transverse sectional views showing steps in a process which produces an article similar to that shown in FIG. 4 but wherein the stretched outer elastomeric tube is bonded to the heat-recoverable tube after the expansion of the latter.

Referring to the drawings, the heat-shrinkable tube 10 shown in FIG. 1 is enclosed by the outer tube 11 and connected by means of a bond such as an adhesive bond 12 joining the outer surface of the tube 10 to the inner surface of the tube 11. Although the bond is referred to as an adhesive bond in describing the drawings, it should be understood that any type of bond may be employed. The tubes are heated and expanded to the position shown in FIG. 2 in which the inner tube 10 is expanded on the mandrel 13, the adhesive bond 12 between the tubes 10 and 11 remaining undisturbed. FIG. 3 shows the tubes 10 and 11 after cooling and after withdrawal of the mandrel 13. The bond 12 is still intact. FIG. 4 shows the final position of the parts after the application of heat to cause the heat-shrinkable tube 10 to shrink down and grip substrate member 14. The bond 12 remains intact between the tubes 10 and 11. A rubber-tired roller is an example of the final product shown in FIG. 4.

The process shown in FIGS. 5-8 is similar to that of FIGS. 1-4 except that the heat-recoverable tube 20 is on the outside and encircles the elastomeric tube 21. The tubes may be bonded by initially expanding heat recoverable tube 20 and then heat to recover it down onto elastomeric tube 21. An adhesive bond 22 may join the outer surface of the elastomeric tube 21 to the inner surface of the outer tube 20. FIG. 6 shows the parts after heating and expanding on the mandrel 23, the adhesive bond 22 between the tubes 20 and 21 remaining intact. FIG. 7 shows the position of the parts after cooling and withdrawal of the mandrel. The adhesive bond 22 prevents the elastomeric tube 21 from shrinking away from the heat-shrinkable tube 20. FIG. 8 shows the position of the parts after the application of heat which causes the tube 20 to shrink. As a result, elastomeric tube 21 will contract about a cylindrical substrate 24 and the recovery of tube 20 will farther compress tube 21 about the substrate 24. The laminated tube assembly of FIG. 8 when shrunk in position around the cylindrical substrate could be used to prevent leakage between ends of two pipes butted together, and the composition of the inner tube 21 might be chosen for its chemical properties in resisting attack by fluids carried in the pipes.

The process shown by FIGS. 9-12 produces a product which is similar to that produced by the process of FIGS. 1-4. As shown in FIG. 9, the heat-shrinkable tube 30 is the only one involved at the time of the initial heating and expanding step. Thus, as shown in FIG. 10, the heat-shrinkable tube 30 encircles the expanding mandrel 33. Either before or after the cooling step, the elastomeric tube 31 is installed, the inner surface of the elastomeric tube 31 being bonded at 32 to the outer surface of the expanded heat-shrinkable tube 30. Generally, it will be necessary that the elastomeric tube 31 be stretched from its normal diameter shown in FIG. 12 to a diameter large enough to slip over the recoverable sleeve of expanded diameter as shown in FIG. 11. FIG. 11 shows the position of the parts after cooling and after withdrawal of the mandrel 33. Upon heating, the inner tube 30 contracts around the metallic support member 34, and the elastomeric tube 31 contracts as well to its normal diameter.

The present invention is applicable to a wide variety of uses. When the elastomeric sleeve is on the outside, the invention may be used as a roller, tire, etc., which may be shrunk onto a wheel or other substrate. Further the structure may be used as an insulating or protective coating where an elastomeric outer surface is desired. When the outer surface is elastomeric, the inner surface may be coated with a suitable adhesive.

The sleeve, when the elastomeric layer is on the inside, may be used to cover electrical joints. The elastomeric layer would normally comprise an insulating material. However, a portion of the inner layer may be made semiconductive by inclusion of conductive particles such as carbon black or metal particles in the layer. Further, the inner surface of the elastomeric may be semiconductive while the remainder of the layer is kept insulating. Thus, in FIG. 8, if substrate 24 were a conductor, the portion of layer 21 closest to 24 might be semiconductive for stress grading termination and splices for high voltage applications. The semiconductive material may be in either layer for stress grading. It may be placed in the heat recoverable layer to provide for shrinking by resistance heating.

The invention can be further understood by reference to the following examples:

EXAMPLE 1

A roller having a heat recoverable inner core and a soft outer surface was prepared using a cylindrical mold. A heat recoverable tubing of polyethylene was recovered onto the core of the mold which was 2.5 inches in diameter. Into the remaining anular cavity was poured a mixture whose primary component was a liquid ester-type polyurethane polymer sold by Thiokol under the trade name SOLITHANE 291. The mixture was prepared by preheating (400 g) SOLITHANE to 185° F. and then a plasticizer, dipropylene glycol dibenzoate (80 g) sold under the trade name BENZOFLEX-88 was blended into the SOLITHANE followed by trimethylolpropane (10.12 g) and triisopropanolamine (4.8 g) as curing agents to chain extend and cross-link the polyurethane. The mixture was heated under vacuum at 155° F. to degas before pouring into the mold. Curing for 1 hour at 300° F. was performed. On subsequent heating expansion and cooling the resulting laminate was heat recoverable and had a soft outer surface.

EXAMPLE II

A stress cone for covering electrical connections can be fabricated as follows: A low modulus elastomeric sleeve is formed by molding ethylenepropylene-diene monomer terpolymer (EPDM) into a soft rubber cone or sleeve. This sleeve has an internal diameter slightly smaller than the outer diameter of the connection which it is to cover when the sleeve is in the relaxed state. An outer sleeve of heat recoverable, low density polyethylene is separately molded. The polyethylene sleeve is then expanded using a heated mandrel. The inner surface of the heat recoverable sleeve and the outer surface of the elastomeric sleeve is then cleaned. An adhesive containing 47.5% ethylenevinyl acetate-carboxylic acid terpolymer sold under the trade name of ELVAX 260 and 47.5% of ethylene-ethyl acrylate copolymer sold under the trade name DPD 6169 and 5% reinforcing carbon block is used to bond the two sleeves. The heat recoverable sleeve is placed over the elastomeric sleeve and shrunk around the elastomeric sleeve at about 175° C. applied for five minutes. Finally, the laminated structure is expanded immediately after shrinkage and while still hot with a mandrel to give the desired inner diameter of the elastomeric sleeve. The sleeve can then be placed over a joint in two conductors and shrunk down in place.

From the foregoing, it can be seen that the invention has many forms and applications. It should be understood that the invention is not limited to the specific examples but rather, is limited only by the scope of the appended claims.

I claim:

1. A tubular article comprising, in combination, an inner tube and a coaxial outer tube, said inner tube comprising elastomeric material and being in a radially expanded condition whereas the outer of said tubes comprises a glassy or crystalline linear polymeric material, said inner radially expanded tube being bonded to and maintained in its radially expanded condition by said outer tube.

2. A tubular article comprising, in combination, an inner tube and a coaxial outer tube, said inner tube comprising elastomeric material and being in a radially expanded condition whereas the outer of said tubes comprises thermoplastic polymeric material, said inner radially expanded tube being bonded to and maintained in its radially expanded condition by said outer tube.

* * * * *